Dec. 11, 1951 G. W. ASHLOCK, JR 2,578,496
APPARATUS AND METHOD FOR THE PREPARATION OF PIMENTO
Filed Feb. 21, 1950 4 Sheets-Sheet 1

INVENTOR.
George W. Ashlock, Jr.
BY
ATTORNEY

Dec. 11, 1951  G. W. ASHLOCK, JR  2,578,496
APPARATUS AND METHOD FOR THE PREPARATION OF PIMENTO
Filed Feb. 21, 1950  4 Sheets-Sheet 2

INVENTOR.
George W. Ashlock, Jr.
BY
Attorney

Dec. 11, 1951  G. W. ASHLOCK, JR  2,578,496
APPARATUS AND METHOD FOR THE PREPARATION OF PIMENTO
Filed Feb. 21, 1950  4 Sheets-Sheet 3

INVENTOR.
George W. Ashlock, Jr.
BY
ATTORNEY

Patented Dec. 11, 1951

2,578,496

UNITED STATES PATENT OFFICE 2,578,496

APPARATUS AND METHOD FOR THE PREPARATION OF PIMENTO

George W. Ashlock, Jr., Oakland, Calif.

Application February 21, 1950, Serial No. 145,466

1 Claim. (Cl. 146—241)

This invention relates to a machine and method for preparing material and particularly pimento in a form suitable for stuffing in olives or other fruit; the invention additionally relates to a machine and a method for preparing an edible material such as a pimento into a sheet having substantially uniform thickness.

The usual material used in stuffing olives is pimento which, as produced by nature, includes segmental ribs which stand rigidly above the adjacent surface so the pimento is of an uneven thickness. When it is attempted to cut a sheet including such a rib into pieces of a uniform size and volume for stuffing into an olive, the rib provides an uneven area interfering seriously with the ease and rapidity of stuffing.

It is a broad object of this invention to provide a method for forming a pimento stuffing material having substantially uniform thickness.

Another object of this invention is to provide a machine for forming a stuffing material of a uniform thickness, particularly pimento.

I have found that the ribs, ridges and other unevenness on a pimento can be eliminated and a sheet of substantially uniform thickness prepared by the gradual application of increasing pressure to the pimento. If the increase of pressure is sufficiently gradual and the maximum pressure of the correct order of magnitude, the ridges on the pimento skin will be compressed to form a sheet of uniform thickness without appreciably altering the color or the physical texture of the adjacent areas of the pimento.

The invention includes other objects and features of advantage, some of which, together with the foregoing, will appear hereinafter wherein the present preferred form of the machine for practicing the invention will be disclosed, and the preferred method of preparing the stuffing material for stuffing into an olive.

In the drawings accompanying and forming a part hereof,

Figure 1:
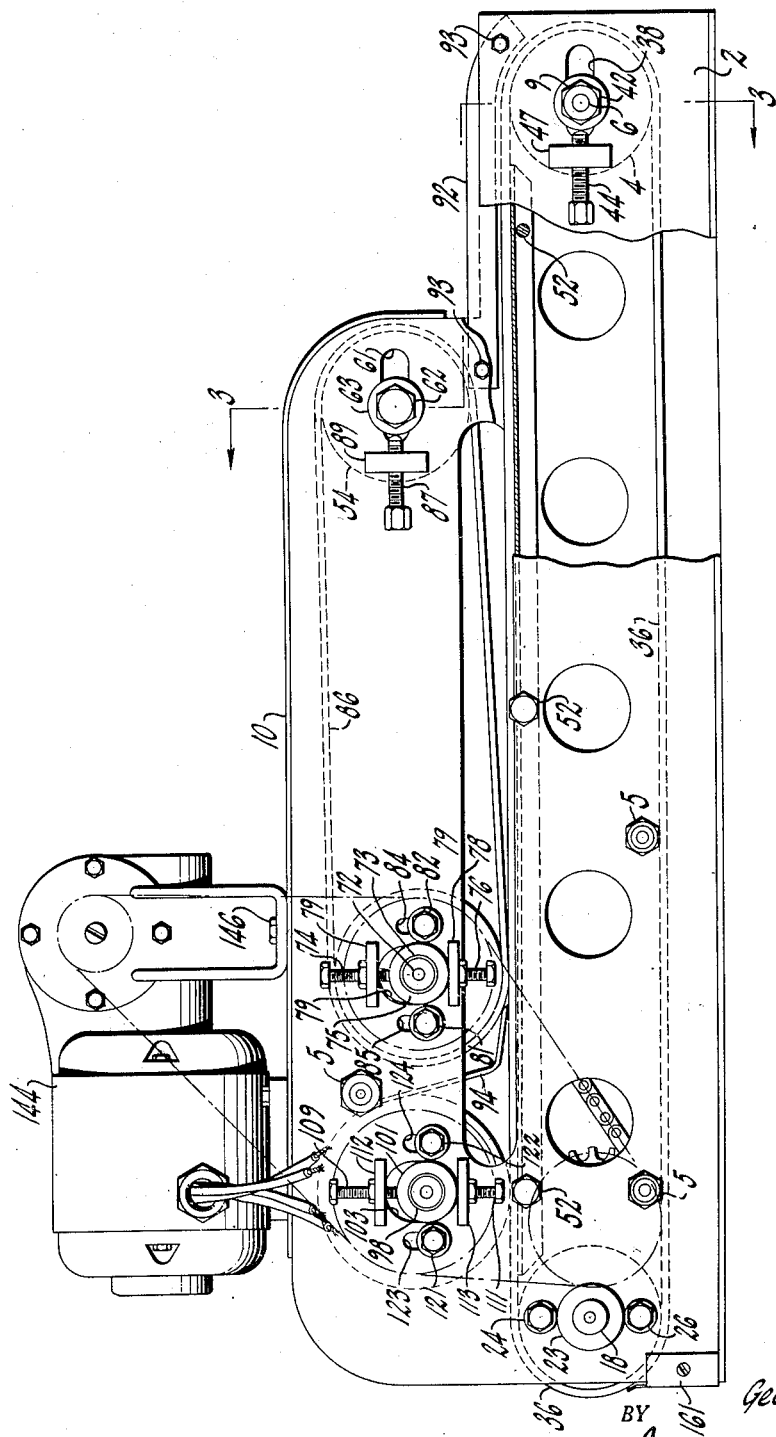
Figure 1 is a side elevation, partially in section, of one side of a machine embodying the present invention.

The machine is supported in a suitable frame structure having two parallel side plates 1 and 2 secured together in a spaced parallel relationship by several spacer bolts 5 and having a cover 10.

A first conveyor structure is mounted on the lower portion of the frame and includes on one end thereof a roller 4 journalled for rotation about a shaft 6, which in turn is supported at one end by the side plate 1 and at its other end by the side plate 2; one end is secured to side plate 1 by a nut 7 and a washer 41 while the other end is secured to side plate 2 by nut 9 and washer 42. Washers 8 and 11 serve to space the roller 4 from the respective side plates 1 and 2. The shaft 6 includes a hollow lubricant channel 12 communicating between a grease fitting 13 and a lubricant reservoir 14 which is located on the roller 4 adjacent to the shaft 6.

On the other end of the conveyor structure is a driver roll 16 which is secured to a rotatable shaft 18 by a set screw 17. One end of shaft 18 is journalled in a bearing 20 located within a bearing housing 19. Bolts 21 and 22 pass through the side plate 1 to secure the bearing housing 19 adjustably thereto. The other end of the shaft 18 is journalled in a bearing 25 located within a bearing housing 23 which passes through the side plate 2. Bolts 24 and 26 secure the bearing housing 23 adjustably to the side plate 2. Two washers 27 and 28 space the roller 16 from the bearing housings 23 and 19. A gear wheel 29 is secured for rotation to the end of the shaft 18 passing through from plate 1.

The conveyor structure is completed by a continuous belt 36 passing around the pulley 16 and the pulley 4. The tension on this belt 36 is adjusted by changing the lateral position of shaft 6 in the horizontal slots 37 and 38 which are located in the side plates 1 and 2. Washers 41 and 42 pass around the shaft 6 and the pressure applied thereto by adjustment screws 43 and 44 passing through welded nuts 46 and 47 laterally move the shaft 6 in the slots 37 and 38, the bolts 46 and 47 being welded to frame plates 1 and 2. The run of the conveyor belt 36 is additionally supported by a plate 51 passing under the upper portion of the continuous belt 36, with the support plate being secured to frame plates 1 and 2 by a multiple of bolts 52.

A second conveyor is mounted above and gradually converges on the first conveyor structure. This structure, on the feed end of the apparatus, includes a roller 54 which is mounted rotatably about a shaft 56 extending on one end through an elongated slot 57 on the side plate 1 and on the other end through a slot 61 in side plate 2. The shaft 56 is secured in the slot 57 by a nut 58 which bears against a ring 59 and is secured in the slot 61 by a nut 62 bearing against the ring 63. Washers 64 and 66 serve to space the roll 54 away from the side plates 1 and 2. A lubricant passage 67 communicates between a grease fitting 68 on washer 58 and a lubricant reservoir 69 located in the roller 54 adjacent to the shaft 56.

On the other end of the second conveyor is a drive roll 71 secured for rotation with a drive shaft 72 which passes through bearing 73 located within a bearing housing 75. The vertical position of the shaft 72 is adjusted within the vertically elongated slot 79 by the movement of adjustment screws 74 and 76 threading through members 77 and 78 which in turn are welded to side of side plate 2. When the proper vertical position of the roll 71 obtains for correct thickness of material passing thereunder, the bearing housing 75 can be rigidly secured to side plate 2 by bolts 81 and 82 passing through vertically elongated slots 84 and 85 in the side plate 2 and threading, on the other side of the side plate 2, into a portion of a bearing housing 75. The other end of the shaft 72 is secured in frame plate 1 in a similar manner.

A belt 86 passes about the rolls 71 and 54 and the tension on the belt is adjusted by screws 87 and 88 which pass through nuts 89 and 90 welded to the side plates 1 and 2. Adjustment screws 87 and 88 bear against the washers 59 and 63 passing about the shaft 56; the lateral position of shaft 56 within the horizontally elongated slots 61 and 57 can be adjusted by the screws 87 and 88.

A lateral guide plate 92 is secured cooperatively adjacent to the belt 36 and the side plate 2 by bolts 93 passing through the side plate 2.

An L-shaped scraper plate 94 extends between the side plate 1 and the side plate 2 and is mounted thereto by one of bolts 5. The lower edge of the scraper plate 94 is cooperatively adjacent to the lower portion of the roller 71 to scrape material from the belt 86 passing under the roll 71.

Figure 4:
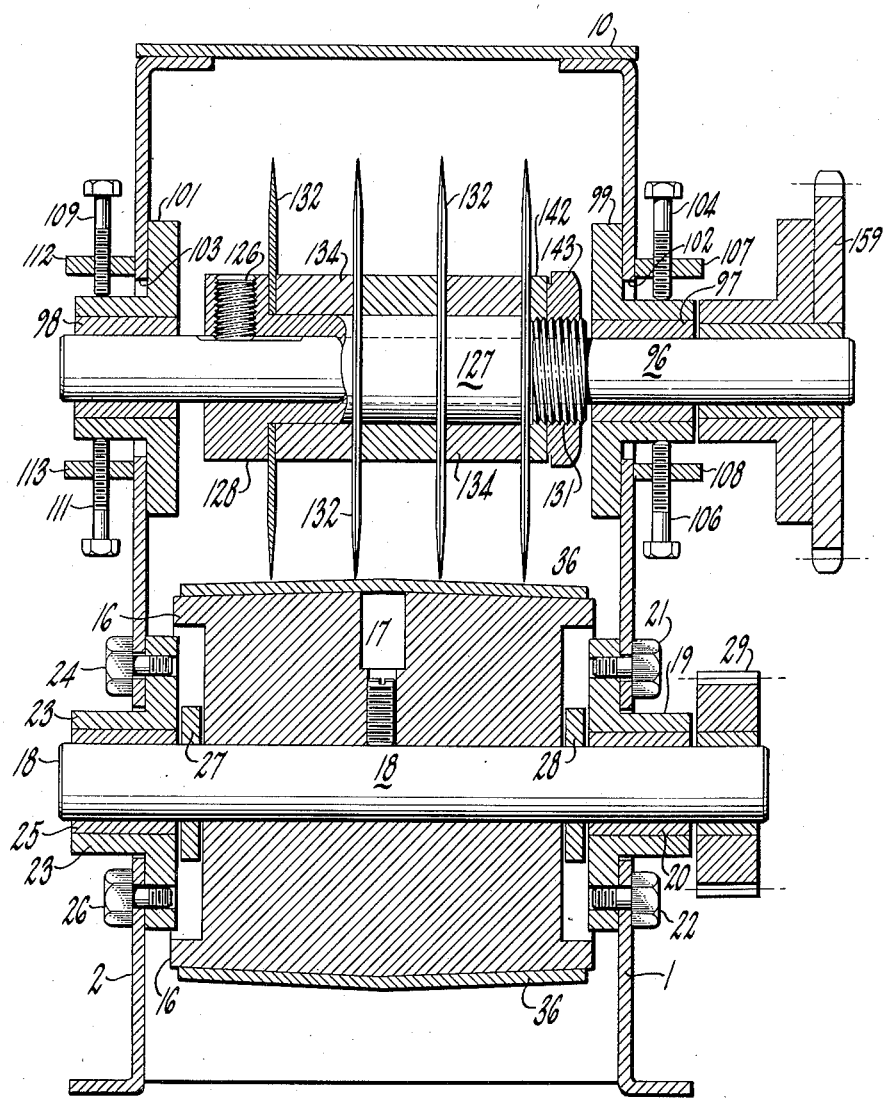
Figure 4 is a section taken along the line 4—4 in Figure 2.

Rearwardly of the roll 71 is a cutting structure hereinafter described. With particular reference to Figure 4, a rotatable shaft 96 passes through bearings 97 and 98 in bearing housings 99 and 101 with the latter being located within vertically elongated slots 102 and 103 in the frame plates 1 and 2. The vertical position of the bearing housings 99 and 101 is controlled by adjustment means including vertically positioned adjustment screws 104 and 106 passing through members 107 and 108 welded to frame plate 1 and vertically positioned adjustment screws 109 and 111 passing through members 112 and 113 welded on frame plate 2. The bearing housing 101 is additionally secured in position on the side plate 2 by the securing means shown in Figure 1. A similar securing means on side plate 1 for bearing housing 99 is obscured by the driving mechanism hereinafter described. On side plate 2 bearing housing 101 is secured by bolts 121 and 122 passing through vertically elongated slots 123 and 124, with the bolts threading into a portion of housing 101 on the inside of side plate 2. These bolts are loosened while the vertical position of the shaft 96 is adjusted and are later tightened to secure rigidly the shaft 96 in position.

With particular reference to Figure 4, the shaft 96 is shown with a knife carrying sleeve 127 fixed on shaft 96 by a set screw 126. The sleeve 127 has an enlarged annular portion 128 and a threaded end 131. Adjacent to the annular portion 128 are several parallel spaced circular knives 132 separated by spacers 134. The spacers and the knives are secured by a nut 142 and a lock nut 143 on the end 131 of the sleeve 127.

Figure 2:
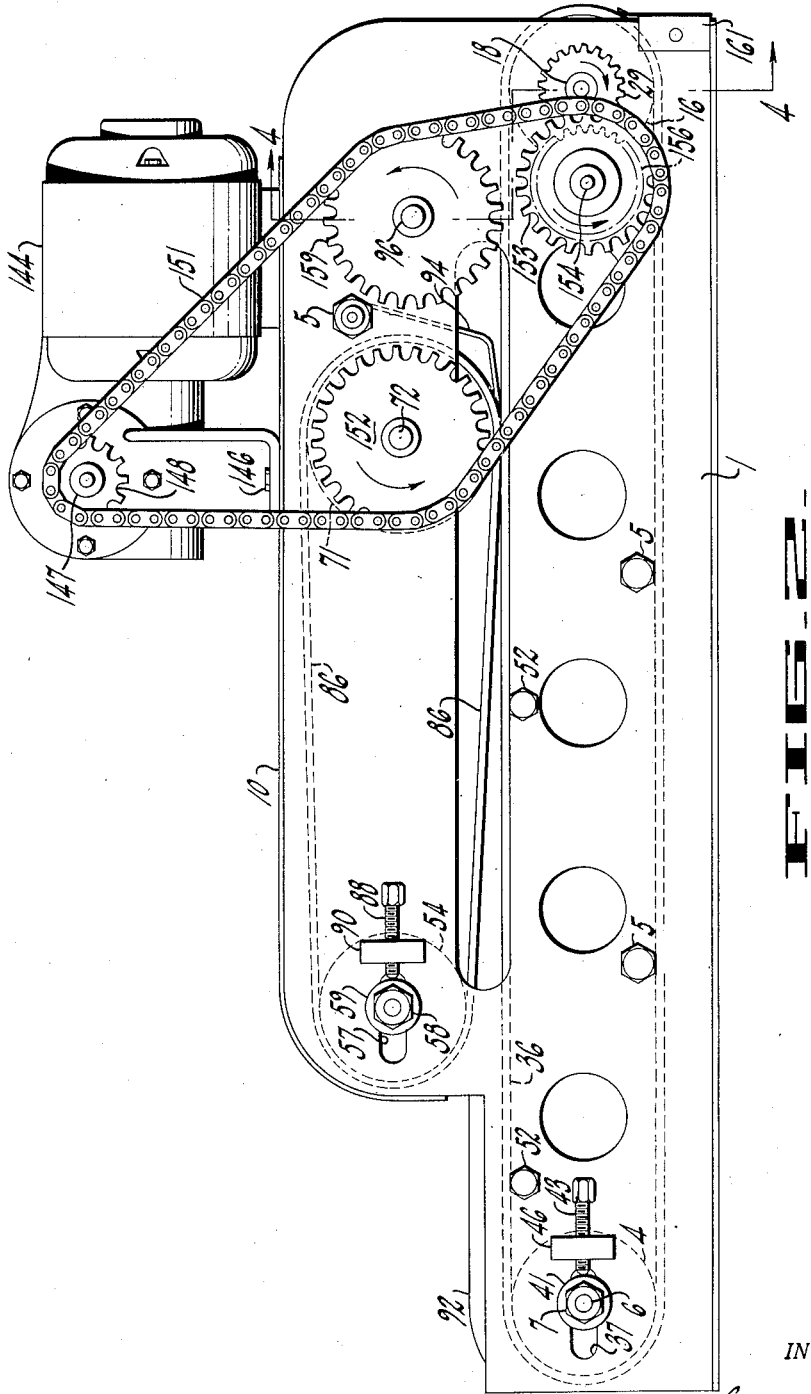
Figure 2 is a side elevation of the other side of the machine.
Figure 3:
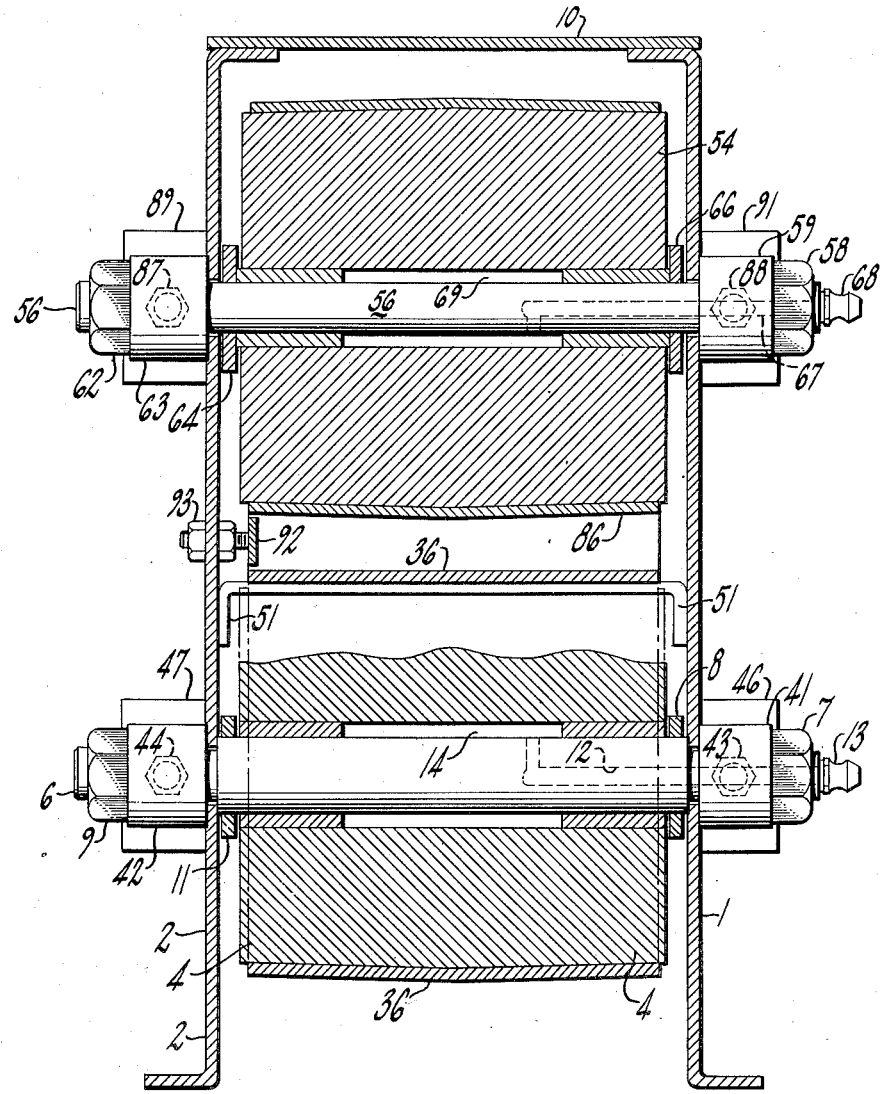
Figure 3 is a section taken along line 3—3 in Figure 1.

With reference to Figure 2, the conveyors and knives are driven by a suitable prime mover 144, which is fastened by bolts 146 to the frame member 10 connecting the upper edges of the side plates 1 and 2. The prime mover 144 drives a shaft 147 to which is secured a spocket 148. A drive chain 151 is driven by the spocket 148 and in turn drives a sprocket 152 which is secured to the end of shaft 72 to rotate roller 71 in a counter-clockwise direction as viewed in Figure 2. A sprocket 153 mounted for rotation about a shaft 154 on plate 1, drives a second gear 156 which is mounted to rotate with sprocket 153. The gear 29 is secured to the end of the shaft 18 and is engaged with the gear 156 to rotate clockwise when the gear 156 is driven counter-clockwise by the drive chain 151. The shaft 96 is driven in a counter clockwise direction by a sprocket 159 mounted thereon, engaging with the chain 151. A scraper blade 161 is provided at the front of the machine between the plates 1 and 2 to remove material adhering to the belt 36.

In operation, power is supplied to the prime mover and, with reference to Figure 2, the upper conveying portion of the conveyor belt 36 moves from the left-hand to the right-hand side from the figure while the lower compressing portion of the compressor belt 86 moves in the same direction. Material to be conditioned, and prepared by usual means and methods, is placed by an operator on the feed or left end of the conveyor against the lateral guide 92 and passes beneath the compressor belt 86 and the compressor roll 71. Because the compressor belt 86 gradually converges on the conveyor belt 36 (see Figure 2), the material placed on the conveyor belt by the operator will have a gradually increased pressure placed thereon, until a maximum pressure obtains when the material passes under the roll 71. The material is scraped from the belt 86 by the scraper 94 and passes as a flat sheet having uniform thickness along the conveyor belt 86. The cutting knives 132 cut the flat sheet into strips of uniform width. Pimento and like materials are thereby prepared of a uniform thickness and width for stuffing into an olive and the like.

I claim:

A process for stuffing olives and the like, consisting essentially in first gradually applying a constantly increasing pressure to a pimento strip by subjecting the same to gradually converging pressing surfaces of rotating rollers thus to form the pimento permanently into a flat sheet having substantially uniform sectional thickness with the ridges on the pimento skin compressed without appreciably altering the color and physical texture of adjacent areas of the pimento, thereafter cutting said sheet into strips having uniform width with a gang of rotating knives, and then finally filling the cavities of previously pitted olives with pimento from said strips.

GEORGE W. ASHLOCK, Jr.

REFERENCES CITED

The following references are of record in the file of this patent:

UNITED STATES PATENTS

| Number | Name | Date |
| --- | --- | --- |
| 41,637 | Pease | Feb. 16, 1864 |
| 349,075 | Bernard et al. | Sept. 14, 1886 |
| 1,469,744 | Wessale | Oct. 2, 1923 |
| 2,131,851 | Anstice | Oct. 5, 1938 |
| 2,212,066 | Fry | Aug. 20, 1940 |
| 2,349,212 | Urschel et al. | May 16, 1944 |
| 2,384,429 | Ball | Sept. 11, 1945 |
| 2,454,316 | Haecks | Nov. 23, 1948 |